United States Patent [19]
Berretta

[11] 3,791,314
[45] Feb. 12, 1974

[54] LAP BOARD FOR FLIGHT PERSONNEL

[75] Inventor: Philip L. Berretta, Castro Valley, Calif.

[73] Assignee: Donald W. Stegeman, Santa Rosa, Calif.

[22] Filed: Feb. 22, 1972

[21] Appl. No.: 227,911

[52] U.S. Cl. ................................................. 108/43
[51] Int. Cl. ............................................ A47b 37/00
[58] Field of Search .............................. 108/42–50

[56] References Cited
UNITED STATES PATENTS

| | | | |
|---|---|---|---|
| 2,471,003 | 5/1949 | Monahan | 108/43 X |
| 2,791,476 | 5/1957 | Atwill | 108/45 |
| 2,791,040 | 5/1957 | Santorelli | 108/43 X |
| 2,533,147 | 12/1950 | Sparks | 108/46 UX |
| 2,592,032 | 4/1952 | Henderson | 108/45 X |
| 1,851,600 | 3/1932 | Stanley | 108/43 |
| 2,701,173 | 2/1955 | Senior et al | 108/43 |
| 3,407,757 | 10/1968 | Warner | 108/43 |
| 2,284,501 | 5/1942 | Welch | 108/43 |
| 2,420,673 | 5/1947 | Monrad | 108/43 UX |
| 2,656,633 | 10/1953 | Bergen | 108/43 |
| 2,881,009 | 4/1959 | Delaney | 108/43 |
| 2,876,022 | 3/1959 | Kroviak | 108/43 |
| 3,215,453 | 11/1965 | Malcom, Jr. | 108/43 |

*Primary Examiner*—Paul H. Gilliam
*Assistant Examiner*—S. O. Finch
*Attorney, Agent, or Firm*—George B. White

[57] ABSTRACT

A foldable lapboard which has on its outside a clip to hold flight charts and another clip to hold a tablet, which is so hinged that when unfolded it forms a single board exposing said chart clip and tablet clip for convenient use; means are provided to lock the board in open position, and friction pads of the inner surfaces are exposed on the bottom of the extended board to prevent the slipping of the board from the lap of the pilot.

2 Claims, 5 Drawing Figures

3,791,314
PATENTED FEB 12 1974
SHEET 1 OF 2
FIG. 1.
FIG. 2.
FIG. 3.
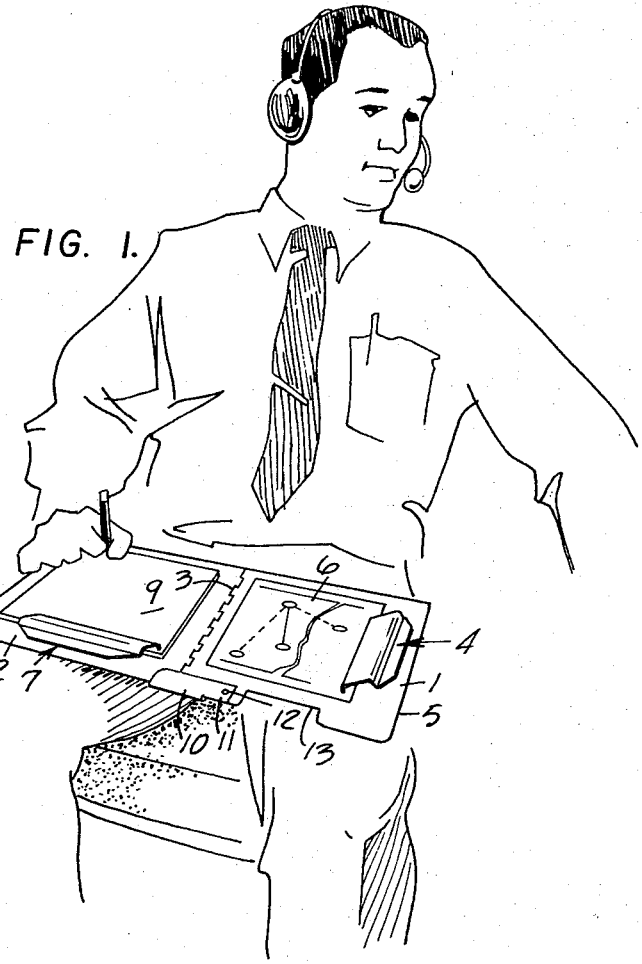
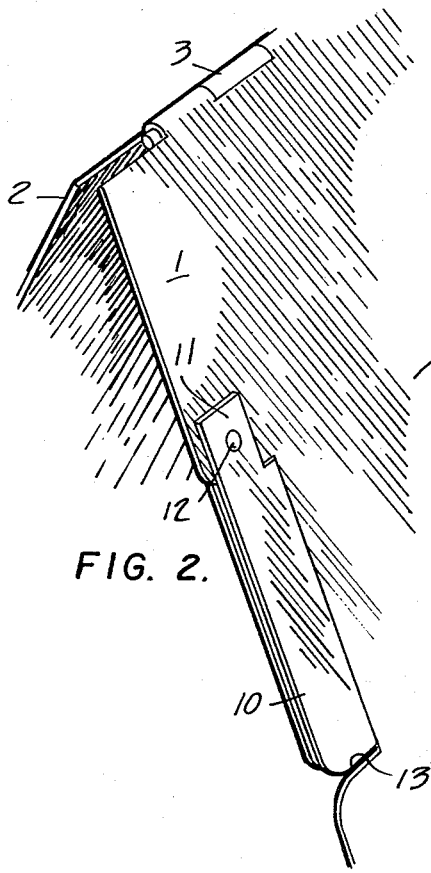
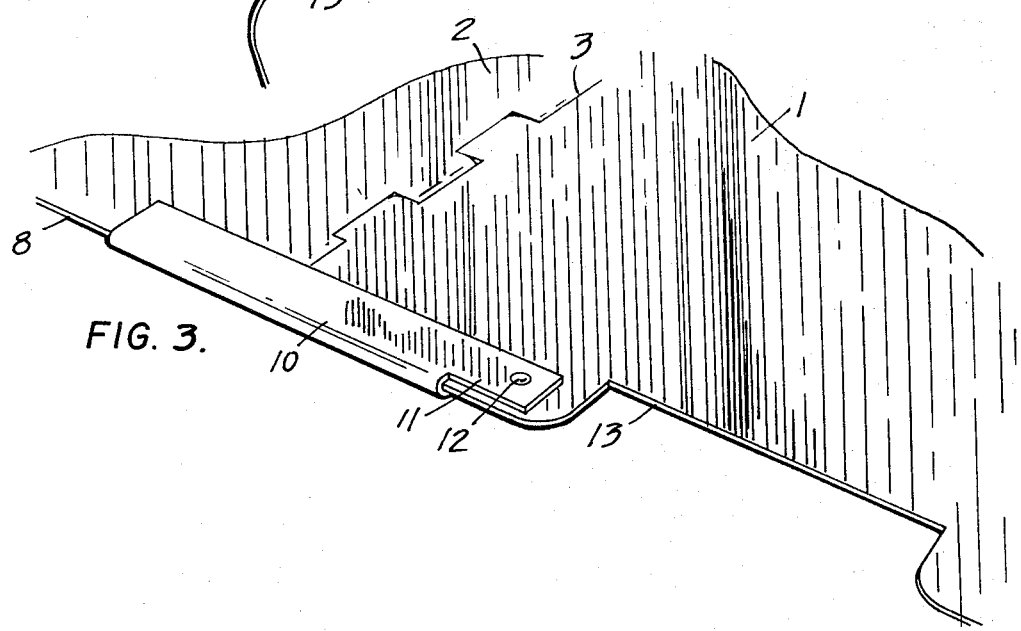

PATENTED FEB 12 1974 3,791,314

LAP BOARD FOR FLIGHT PERSONNEL

BACKGROUND OF THE INVENTION

Aircraft operations on Instrument Flight Plans (IFP) often require flight within clouds in adverse weather conditions. This requires the pilot to control his aircraft solely by reference to flight instruments and to navigate based on clearances issued by Air Traffic Control and by reference to various flight charts.

In order for the pilot to complete his flight safely and efficiently he must be organized in the cockpit. Navigation charts need to be open so that the pilot can refer to them as the flight progresses and writing materials need to be convenient to copy amended clearances received from A.T.C. over the radio. Prior to this invention the organization of charts and writing materials was very awkward and inefficient which added to the tension and anxiety of the pilot. Charts and writing materials were frequently laid on the lap of the pilot and consequently the charts would get mixed up or fall off the pilot's lap during the course of the flight and he would have to fumble to find them and relocate his position on them. This could be very dangerous because the pilot could lose control of his aircraft in the process or induce vertigo which could lead to loss of control. It was also very inconvenient to write on a tablet or other writing material without having a firm, hard surface on which to write. This, too, added to the tension of the pilot and reduced his flying efficiency.

The primary object of this invention is to provide a compact unit on which the opposite leaves are hinged together so that they can be folded for storage in flight case when not in use and carry charts and a writing pad, which unit can be locked in extended flat position with suitable clips to hold the chart and the pad conveniently to the pilot, with suitable friction pads on the inner or bottom surface to prevent the slipping of the extended board off the lap.

BRIEF DESCRIPTION OF DRAWINGS

FIG. 1 is a perspective view showing the extended board held on the lap.

FIG. 2 is a fragmental perspective view showing the leaves partly open.

FIG. 3 is a fragmental view showing the locking device to hold the leaves extended.

DETAILED DESCRIPTION

Figure 4:
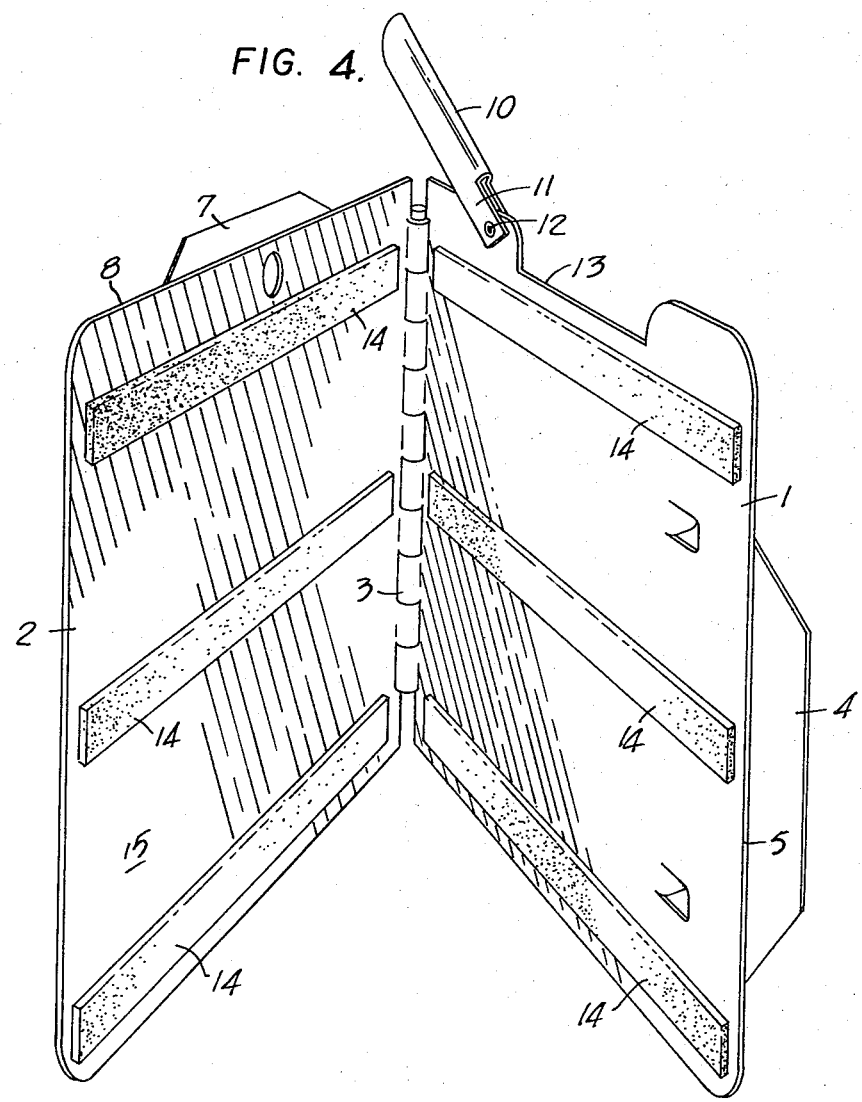
FIG. 4 is a perspective view showing the bottom of the board and the inside of the leaves partly closed.
Figure 5:
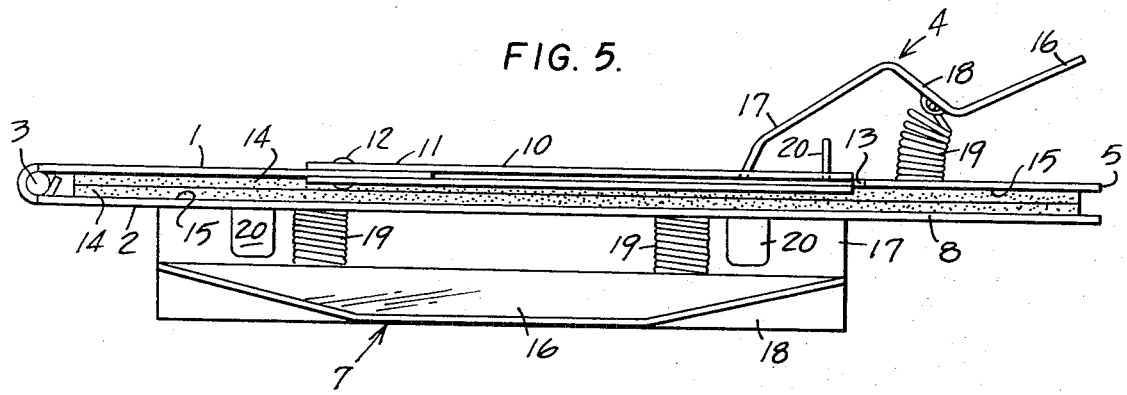
FIG. 5 is an end view of the leaves folded.

Leaf 1 and leaf 2 are foldably connected by a transverse hinge 3. A spring clip 4 adjacent the outside or free transverse edge 5 holds charts 6. A spring clip 7 adjacent the top or longitudinal edge 8 of the other leaf 2, at right angles to transverse edge 5, holds a writing pad 9 in suitable writing position.

A locking strip 10 consists of a rigid strip bent longitudinally upon itself into a substantially U-shaped cross-section to form a groove fitting over the contiguous edges of the leaves. The strip 10 has a pair of parallel ears 11 pivoted on a pivot pin 12 on leaf 1, the pivot being at such distance from the hinge 3, that the locking strip 10 can be inserted over the adjacent contiguous edge portions of leaves 1 and 2 and thereby hold them extended as shown in FIG. 1. A cutaway recess 13 in the top edge of leaf 1 is adjacent the pivot pin 12 and is spaced therefrom a distance not less than the length of the ears 11, and is of such length as to permit the nesting of the locking strip 10 in the recess 13 as shown in FIG. 2.

Suitable friction pads 14 are provided on the inner faces 15 of each leaf 1 and 2. For example, the pads may be spaced sponge rubber strips arranged transversely on each leaf 1 or 2, and thus longitudinally of the lap board on the lap of the user.

Each spring clip 4 or 7 has a handle flange 16, a gripping flange 17, and a middle portion 18 secured on top of a pair of spaced coil springs 19 secured on the outside of the respective leaf 1 or 2 and biased toward normally urging the grip flange 17 against the writing pad or charts respectively. A pair of aligning prongs 20 are struck out of each leaf 1 or 2 beneath each grip flange 17 to align the writing pad or the chart, as the case may be, under the respective grip flange 17.

When the leaves 1 and 2 are folded they assume the appearance of a closed book with friction pads 14 between them and the spring clips 4 and 7 on the outside of the book forming a compact readily portable unit which may also contain the charts 6 and the writing pad 9 on the outside faces thereof. The book-like unit can be quickly opened and extended and then by the lock strip 10 can be locked into a rigid lap board with all items in readiness for use, and securely held on the lap by the exposed friction pads 14. The outside faces of the folded leaves 1 and 2 with spring clips holding the working sheets thereon, become the top or working surface of the extended lap board, and the inside faces of the folded leaves with the friction strips thereon become the under face of the lap board.

I claim:

1. A lap board for flight personnel comprising,
    a pair of leaves hinged together transversely approximately across the middle of the board,
    said leaves being foldable about said hinge upon one another, the superimposed meeting faces being the inside faces of said leaves,
    clamping means on the outside faces of the folded leaves for clamping work sheets exposed on the respective outside faces,
    friction pads on the inside faces of the folded leaves,
    and releasable locking means to lock said leaves into extended position to form a lap board whereby said outside faces become a substantially continuous top face and said inside faces with the friction pads become the underface of the lap board,
    said releasable locking means including,
    a rigid strip having a longitudinal groove formed in one edge thereof fitting over contiguous edges of said leaves in extended position,
    one end of said rigid strip being pivotally attached to one of said leaves on a pivot axis at about right angles to the plane of said one leaf,
    the leaf on which said strip is pivoted having a recess adjacent said pivot axis accommodating said locking strip in releasing position folded into said recess.

2. The lap board specified in claim 1, and
    said clamping means being spring clips and being positioned along outside edges of the respective leaves at right angles to one another.

* * * * *